US009805010B2

(12) United States Patent
Pittenger et al.

(10) Patent No.: US 9,805,010 B2
(45) Date of Patent: Oct. 31, 2017

(54) METHODS AND APPARATUS FOR REDACTING RELATED CONTENT IN A DOCUMENT

(75) Inventors: Jason T. Pittenger, San Francisco, CA (US); David Stromfeld, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2690 days.

(21) Appl. No.: 11/477,142

(22) Filed: Jun. 28, 2006

(65) Prior Publication Data

US 2014/0033029 A1    Jan. 30, 2014

(51) Int. Cl.
G06F 17/00 (2006.01)
G06F 17/24 (2006.01)
G06F 17/22 (2006.01)
G06F 17/21 (2006.01)
G06F 17/27 (2006.01)
G06F 21/62 (2013.01)

(52) U.S. Cl.
CPC .............. *G06F 17/24* (2013.01); *G06F 17/21* (2013.01); *G06F 17/211* (2013.01); *G06F 17/2288* (2013.01); *G06F 17/241* (2013.01); *G06F 17/243* (2013.01); *G06F 17/277* (2013.01); *G06F 21/6245* (2013.01)

(58) Field of Classification Search
CPC ... G06G 17/241; G06F 17/21; G06F 17/2288; G06F 17/24; G06F 17/241; G06F 17/243; G06F 17/2771; G06F 21/6245
USPC .......................... 715/200, 229–233, 253, 255
See application file for complete search history.

(56) References Cited

U.S. PATENT DOCUMENTS

| 5,517,586 A | * | 5/1996 | Knowlton | G06K 9/2054 382/171 |
| 5,581,682 A | * | 12/1996 | Anderson | G06F 17/241 715/236 |
| 6,141,007 A | * | 10/2000 | Lebling et al. | 715/792 |
| 6,279,014 B1 | | 8/2001 | Schilit et al. | |
| 6,397,194 B1 | | 5/2002 | Hoevener et al. | |

(Continued)

FOREIGN PATENT DOCUMENTS

EP    0 902 379 A2    3/1999

OTHER PUBLICATIONS

Newman, et al., "CannWorks: a Video-based Tool for Efficient Capture from Paper Source Documents," IEEE International Conference on Multimedia Computing and Systems ICMCS, Florence, Italy, p. 1-7, Jun. 1999.

*Primary Examiner* — Chau Nguyen
(74) *Attorney, Agent, or Firm* — Kilpatrick Townsend & Stockton LLP

(57) ABSTRACT

A method for redacting related content in a document by executing a redaction manager process that searches for related content in at least one document and then provides a means for selecting instances of the content for redaction. The related content may include properties such as, for example, identical instances of a text string, instances of related graphics, instances of numeric values and/or numeric patterns, proper names, phone numbers, addresses and similar searchable data properties. Upon searching and retrieving the desired data, the redaction manager process displays a listing of the instances of content which affords a user the ability to select which particular instances of content to redact within the document.

18 Claims, 13 Drawing Sheets

(56) References Cited

U.S. PATENT DOCUMENTS

| | | |
|---|---|---|
| 6,671,684 B1 | 12/2003 | Hull et al. |
| 6,684,369 B1 | 1/2004 | Bernardo et al. |
| 6,859,909 B1 | 2/2005 | Lerner et al. |
| 6,903,751 B2 | 6/2005 | Saund et al. |
| 7,409,248 B2 | 8/2008 | Davignon et al. |
| 7,428,701 B1 | 9/2008 | Gavin et al. |
| 2001/0046096 A1* | 11/2001 | Worden .............. G11B 27/031 711/111 |
| 2002/0083079 A1 | 6/2002 | Meier et al. |
| 2004/0034835 A1 | 2/2004 | Kuruoglu et al. |
| 2004/0088286 A1* | 5/2004 | Hackleman ....... G06F 17/30864 |
| 2004/0143564 A1* | 7/2004 | Gross et al. ...................... 707/1 |
| 2005/0188226 A1* | 8/2005 | Kasatani ...................... 713/201 |
| 2006/0206462 A1* | 9/2006 | Barber ............................ 707/3 |
| 2006/0212443 A1* | 9/2006 | Oyarce ............................ 707/5 |
| 2006/0242558 A1* | 10/2006 | Racovolis et al. ............ 715/511 |
| 2006/0259983 A1* | 11/2006 | Sperry ................ G06F 21/6245 726/28 |
| 2007/0030528 A1 | 2/2007 | Quaeler et al. |

* cited by examiner

METHODS AND APPARATUS FOR REDACTING RELATED CONTENT IN A DOCUMENT

BACKGROUND

Conventional computer systems operate software applications that assist users in document processing and modifying information contained such documents. Such software applications are commonly used to perform tasks for computer users such as word processing, graphic design, image processing and the like. Typically, these software applications provide users with a variety of tools that facilitate the modification of data within a document. More specifically, conventional software applications provide tools enabling a user to select data, such as text or image data, within a document and to manipulate and/or delete the selected data (e.g., highlighting a text string in a word processing document and subsequently deleting the highlighted text, or changing the font of the highlighted text).

As another example, various conventional software applications include redaction tools that modify, or mark-up, text data within a document such that the data is unrecognizable and/or irretrievable by other users who have subsequent access to the document. Generally, such conventional redaction tools modify text within a document resulting in a 'black box' or similar rectangular graphical barrier that serves as a place-filler in lieu of the redacted text. An example application of a conventional software redaction tool involves the redaction of sensitive information contained in electronic documents as part of the discovery phase during litigation.

Other document processing technologies include search features such as find and replace that allow a user to input a text string that a document processing program such as a word processor can search for and find all occurrences in the documents. Such programs typically show each specific occurrence separately, one by one, and ask the user if he or she desires to replace the found text with user-specified replacement text. In this manner, the user can replace strings in a document with the replacement text. Some find and replace utilities allow the user to select a "replace all" feature that if selected, causes the conventional processing to perform an automatic replacement on all occurrences of the user specific text with the user specified replacement text.

SUMMARY

Conventional software applications that enable a user to redact data in a document suffer from a number of drawbacks. In particular, conventional document processing software applications that contain digital redaction techniques are limited in that these applications do not provide a method for searching, viewing, selecting and redacting related content within a document via a graphical user interface. While some conventional technologies exist that do allow the piecemeal redaction, or sometimes a batch processing means for digital redaction of content, such technologies are not able to allow a user to interactively search for related content within a document(s) and then subsequently provide a user the ability to interact with a graphical user interface to select various instances of related content to redact. Thus, using conventional redaction software, a user must manually redact each discrete portion of related content contained in a document and the user is not guided by a search feature that can automatically apply redaction to each instance of a searched-for term. This drawback is further amplified where large volumes of data (e.g., text) are contained in one or more documents such that redacting related content (e.g., social security numbers) in those documents can prove to be a cumbersome and tedious task.

Another drawback of conventional document processing software that uses redaction of document content results from the inability of conventional redaction software to provide an efficient means for selecting particular and discrete instances of content to redact in the document. For example, with conventional technology a user cannot search a document for all instances of social security numbers and then subsequently interactively select (e.g., from a list of retrieved instances of social security numbers within the document), with particularity, which social security numbers to redact. In other words, a user cannot elect to redact some retrieved instances of social security numbers within a document while excluding other instances of social security numbers from the redaction process. Conventional redaction systems are limited to all or nothing approaches.

Embodiments disclosed herein provide a method for redacting related content in a document by executing a redaction manager process that searches for related content in at least one document and then provides a means for interactively (e.g. via a user operating a graphical user interface) selecting instances of the content for redaction. The related content may include properties such as, for example, matching instances of a text string, instances of related graphics, instances of numeric values and/or numeric or alphanumeric (e.g. character) patterns, proper names, symbols, formulas, phone numbers, addresses and similar searchable data properties.

Upon searching and retrieving the desired data, the redaction manager process displays a listing of the instances (i.e., different occurrences) of content within the document which affords a user the ability to select which particular instances of content to redact within the document. Additionally, upon selecting an instance of content, the redaction manager provides a view within the body of the document of the corresponding content to which redaction will be applied. This allows the user to see the context of that specific instance as it pertains to surrounding or "related" content. In one configuration, the user can elect to redact not only the specific instance of the content discovered in the search, but can also include related content that is proximal or "nearby" the specific redacted content in order to remove the context indicating content that may surround the specific instance of content. Embodiments of the redaction manager process disclosed herein therefore substantially overcome the aforementioned drawbacks.

Generally, as in one embodiment disclosed herein, the redaction manager process renders a redaction view providing a content identification region for input of the identification of content in the document. The content identification region is typically an interactive field within graphical user interface that enables a user to enter a specific text string search term. In turn, the redaction manager process receives user input that defines the identification of content in the document. With the receipt of the user input defining the identified content, the redaction manager process searches the document for matching occurrences of the identification of content, whereby each occurrence indicates an instance of content to which redaction can be applied. In alternate embodiments, the redaction manager may search multiple files nested in multiple folders contained within the file system of a computer. After completing the search, the redaction manager process renders each instance of content to which redaction can be applied in the redaction view. The redaction view in one configuration is generally a list of each occurrence of the searched-for content. The user then chooses which content to redact such that the redaction manager process receives the selection of at least one instance of content. In response, the redaction manager process applies the redaction function to content in the document corresponding to the at least one selected instance of content.

In accordance with another embodiment discussed here, the redaction manager process receives a location selection of an instance of content in the redaction view. As an example, the user may chose a specific listed instance from the list of occurrences of the searched-for content within the redaction view. In response to receiving the location selection, the redaction manager process displays, in a content view (e.g. within the document itself), a location in the document where content exists that corresponds to the instance of content for which the location selection was received. This allows the user to see the full context of that instance of content as it appears within the document. The redaction manager process then receives at one least one redaction selection of at least one instance of content in the redaction view. The redaction selection is an indication of a selection of instance of content that are to be redacted, but the redaction is not yet made permanent. As a result, for each redaction selection the redaction manager process identifies a target redaction region defined by the corresponding instance of content in the body of the document. Typically, with respect to the redaction of text, the target redaction region is a rectangular area surrounding the proximate region defined by the graphical representation of the text. Having identified the target redaction region(s) in the body of the document, the redaction manager process renders each target redaction region in a pre-redaction format, whereby the pre-redaction format provides a graphical representation of the target redaction region before the application of the redaction function. For example, the pre-redaction format may consist of an outlined box with an 'X' marked inside the box. The pre-redaction format in one configuration thus renders the content in a still-readable or recognizable form, but surrounds or otherwise demarcates the content with an indicator that shows the user what will be redacted if the users decides to commit to the redaction. Other pre-redaction formats can include, for example, a strike through, underline, highlight, surrounding the content in braces or brackets, changing the color of the content, and so forth. In this manner, the user can see what content will be redacted and how the document will appear once redacted prior to committing to the actual redaction of the content. Once the user has determined that he or she is satisfied with the selected instances of content, the user can apply the redaction function to redacted the content.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein. Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM, PROM or FPGA chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif.

BRIEF DESCRIPTION OF THE DRAWINGS

The foregoing and other objects, features and advantages of the invention will be apparent from the following more particular description of embodiments of the methods and apparatus for redacting related content in a document, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus for redacting content in a document.

FIG. 5 is a graphical representation that illustrates one implementation of the redaction manager process when it renders each instance of content to which redaction can be applied in a redaction view.

FIG. 9 is a graphical representation that illustrates one implementation of the redaction manager process when it searches each of a plurality of documents for occurrences of an identification of content.

FIG. 12 is a graphical representation that illustrates one implementation of the redaction manager process when it receives a location selection of an instance of content in the redaction view.

DETAILED DESCRIPTION

Figure 1:
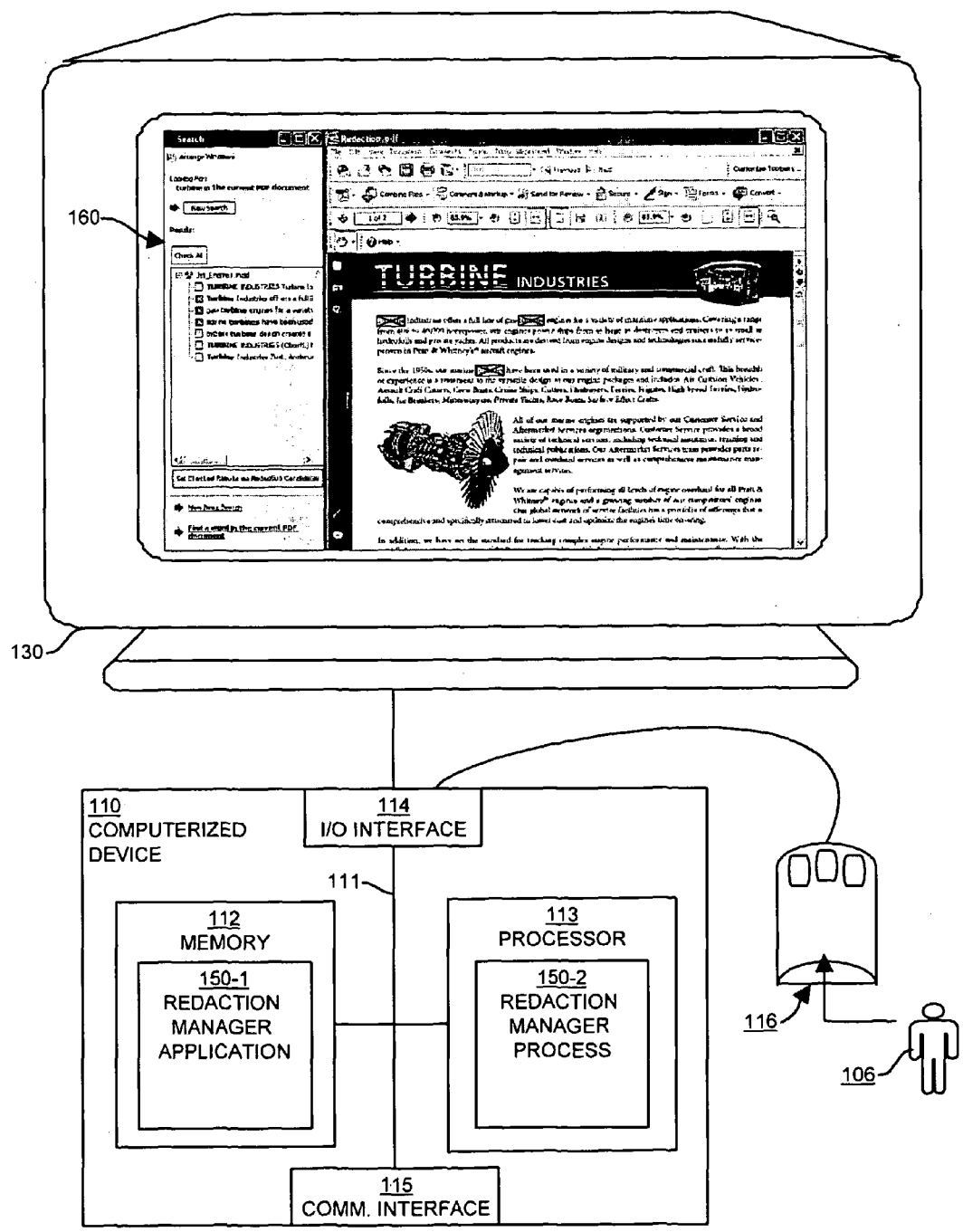
FIG. 1 is a block diagram of a computerized system configured with an application including a redaction manager process in accordance with one embodiment of the invention.

FIG. 1 is a block diagram illustrating example architecture of a computer system 110 that executes, runs, interprets, operates or otherwise performs a redaction manager application 150-1 and process 150-2 configured in accordance with embodiments of the invention. The computer system 110 may be any type of computerized device such as a personal computer, workstation, portable computing device, console, laptop, network terminal or the like. As shown in this example, the computer system 110 includes an interconnection mechanism 111 such as a data bus, motherboard or other circuitry that couples a memory system 112, a processor 113, an input/output interface 114, and a communications interface 115. An input device 116 (e.g., one or more user/developer controlled devices such as a keyboard, mouse, touch pad, etc.) couples to the computer system 110 and processor 113 through an input/output (I/O) interface 114 and enables a user 106 to provide input signals and generally control a graphical user interface 160 that the redaction manager application 150-1 and process 150-2 provides on the computer display 130.

The memory system 112 is any type of computer readable medium and in this example is encoded with a redaction manager application 150-1 that supports generation, display, and implementation of functional operations as explained herein. The redaction manager application 150-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the redaction manager application 150-1. Execution of the redaction manager application 150-1 in this manner produces processing functionality in a redaction manager process 150-2. In other words, the process 150-2 represents one or more portions or runtime instances of the application 150-1 (or the entire application 150) performing or executing within or upon the processor 113 in the computerized device 110 at runtime. Operation of the redaction manager application and process generally allows a user to interactively specify content to be redacted from a document and the process 150-2 can search the document to find each instance of the specified content. The user is then able to visualize instances of the content that occur in the document. For each instance, the user can view that instance within the document itself, and can see surrounding context for that instance. Specific instance can be selected, and the user is presented with a preview of how the document will be modified if the redaction of the selected instances is applied. In this pre-redaction format, the content can be rendered in a format that still allows the reader to view the content to be redacted, but also differentiates this content from content that will not be redacted, thus allows the user to preview the redacted document before committing to the redaction. In some configurations, the user is able to indicate that nearby content to the user specified content also be included in the redaction in order to remove the context surrounding the user specified content.

Further details of configurations explained herein will now be provided with respect to flow charts of processing steps that show the high level operations disclosed herein to perform the redaction manager process 150-2, as well as graphical representations that illustrate implementations of the various configurations of the redaction manager process 150-2.

Figure 2:
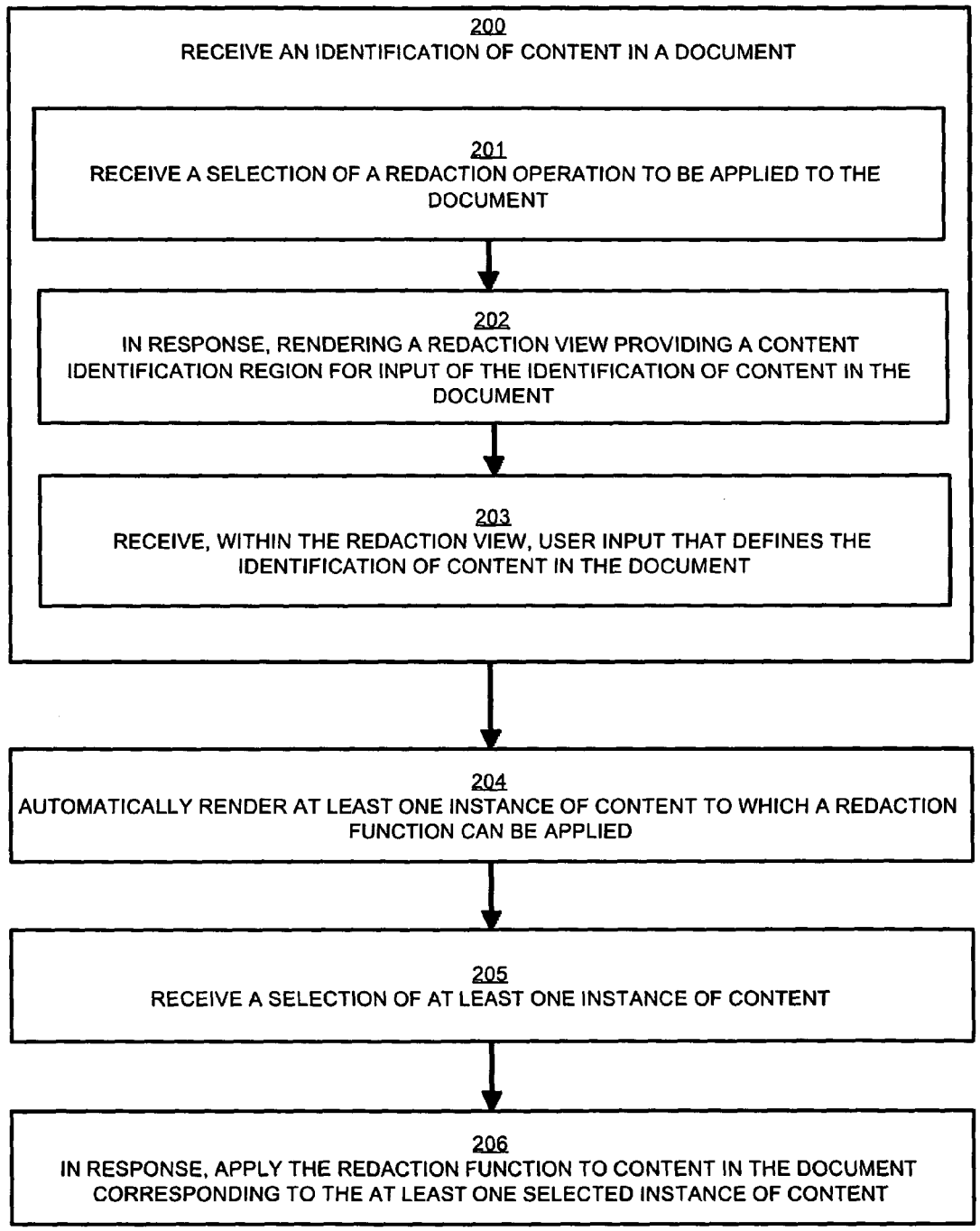
FIG. 2 is a flow chart of processing steps that shows high-level processing operations performed by the redaction manager process when it processes document data in accordance with one example configuration of the invention.

FIG. 2 is a flow chart of processing steps that shows high-level processing operations performed by the redaction manager 150 when it identifies a second portion of content in a target layer in accordance with one example configuration.

In step 200, the redaction manager 150 receives an identification of content 190 in a document. Typically, a human user provides the redaction manager 150 with the identification of content 190 within the document. However, the scope of the invention further contemplates the reception of the identification of content 190 from other sources such as a separate process running on the same or a different computerized device or, in various situations, the redaction manager providing the identification of content 190 within the document.

Figure 3:
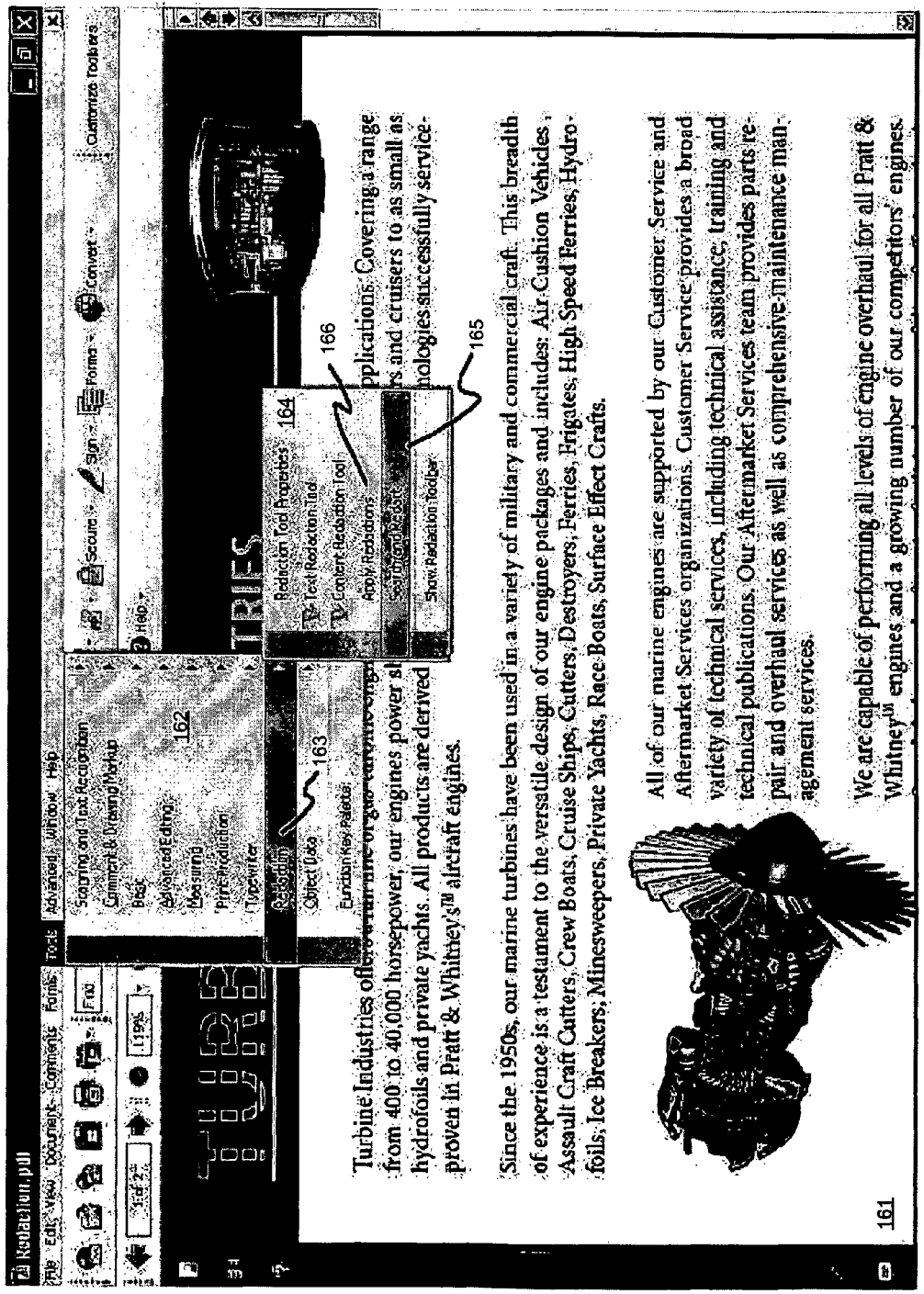
FIG. 3 is a graphical representation that illustrates one implementation of the redaction manager process when it receives a selection of a redaction operation to be applied to a document.

In step 201, the redaction manager 150 receives a selection of a redaction operation 165 to be applied to the document. By selecting the redaction operation, a user and/or process initiates a series of steps to be performed by the redaction manager 150 on the identified content 190 in the document. To demonstrate this, FIG. 3 shows an illustration of an example implementation of the redaction manager 150 as a graphical user interface 160 within the display area 161. The graphical user interface 160 includes a drop down menu 162 with a 'redaction' option 163 that provides a suite of redaction tools 164. In turn, the suite of redaction tools 164 includes redaction operation 165 and redaction commitment 166 options. Thus, as in the example embodiment depicted in FIG. 3, the redaction manager 150 receives a selection of a redaction operation 164 in the graphical user interface 160.

In step 202, the redaction manager 150, in response, renders a redaction view 170 providing a content identification region 171 for input of the identification of content 190 in the document. In one example embodiment, the redaction view 170 is a separate display area within the graphical user interface 160. However, the redaction view 170 may also consist of a command line or display area contained in a separate graphical user interface such as a dialog box or pop-up window. The content identification region 171 is an interactive field whereby a user can customize either a general or specific search for instances of content in the document.

Figure 4:
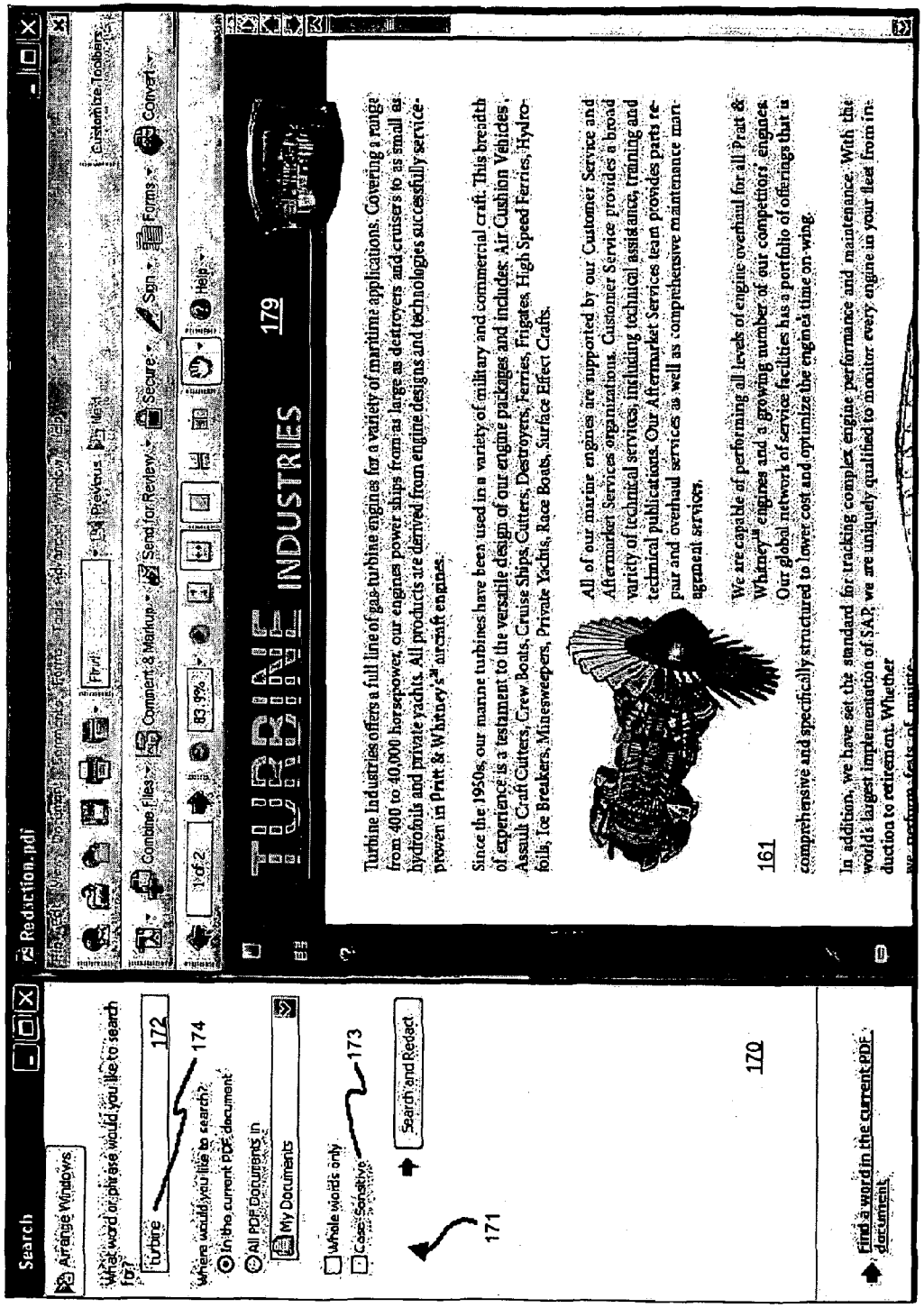
FIG. 4 is a graphical representation that illustrates one implementation of the redaction manager process when it receives, within a redaction view, user input that defines an identification of content in a document.

FIG. 4 is an illustration of an example embodiment of the redaction manager 150 having graphical user interface 160 with display area 161. In this particular embodiment, the graphical user interface 160 also contains a redaction view 170 with a content identification region 171. In this example embodiment, the content identification region 171 includes several interactive features for customizing a content search within the document. For instance, the content identification region 171 in this example embodiment has, inter alia, a field 172 for entering a text string to be searched within the document and a toggle box 173 for implementing a case-sensitive search of the text string.

In step 203, the redaction manager 150 receives, within the redaction view 170, user input 174 that defines the identification of content 190 in the document. Generally, the user input 174 that defines the identification of content 190 in the document is a text string resulting with the redaction manager 150 conducting searches for similar text strings that occur within the body of the document. As shown in the example embodiment of FIG. 4, the redaction manager 150 receives user input 174 (e.g., the text string "turbine") in the content identification region 171. Additionally, as in a separate embodiment, the user input may define a variety of data properties such as, for example, metadata associated with various objects and elements located within the document (e.g., display area 161).

In another embodiment, the redaction manager 150 receives a selection of content from within the body of the document and, in response, the redaction manager 150 uses the selection of content for identification of the content in the document. As an example of this embodiment, the redaction manager 150 receives a selection of text that has been highlighted using a mouse and cursor within the body of the document to identify the specific phrase or other content that defines what to search for in the document to identify other instances. In turn, the redaction manager 150 identifies the highlighted text as the content in the document. Additionally, yet another embodiment includes the redaction manager 150 receiving user input to identify content from both the content identification region 171 and the body of the document (e.g., display area 161).

Figure 5:
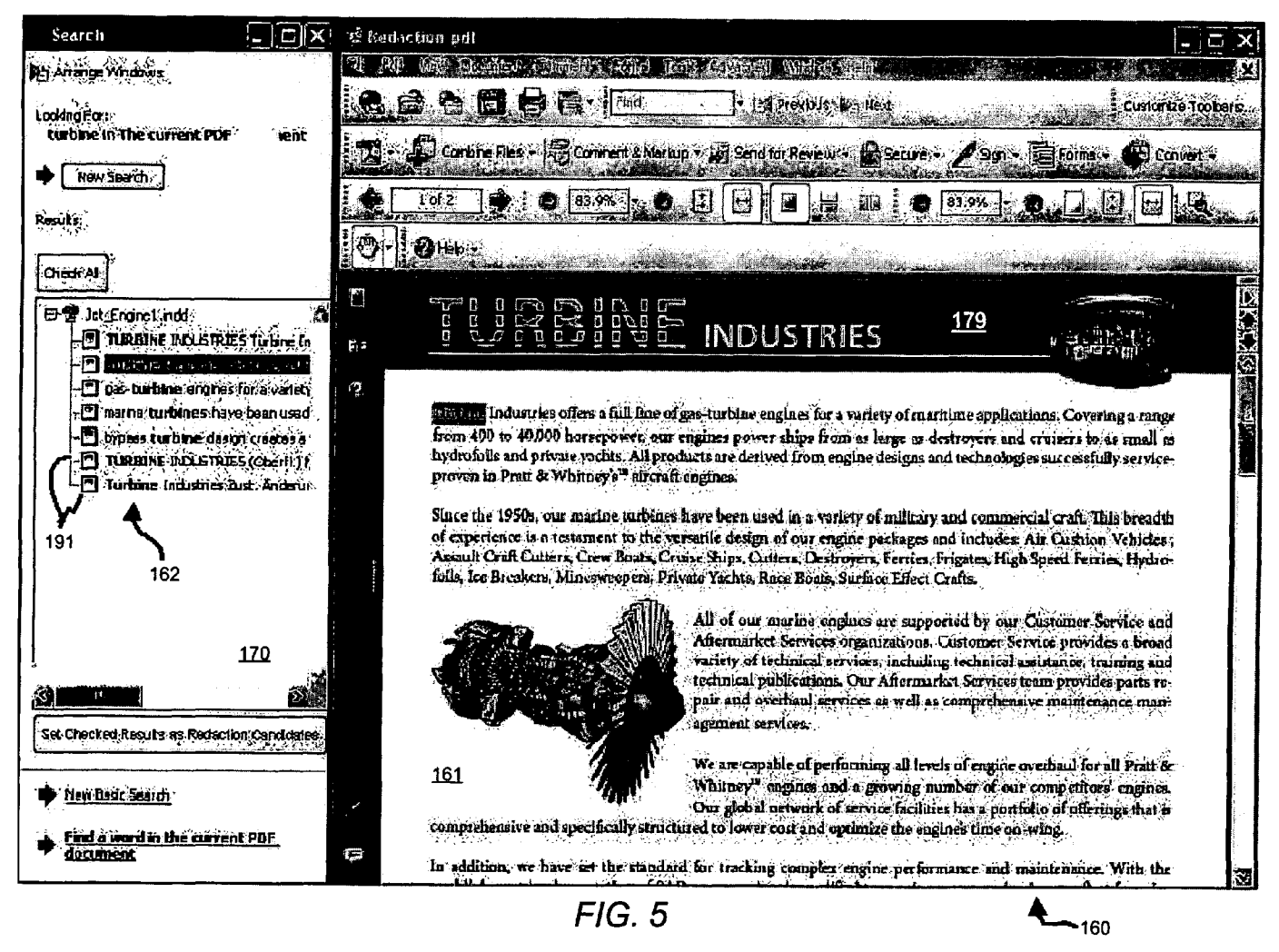

In step 204, the redaction manager 150 automatically renders at least one instance of content 162 to which a redaction function can be applied. In this processing, the redaction manager 150 searches the document for instances of content 162 in the document and, as a result, displays the instance(s) of content 162 in the redaction view 170 of the graphical user interface 160. For example, FIG. 5 depicts an example embodiment whereby the redaction manager 150 renders a redaction view 170 in the graphical user interface 160 and displays instances of content 162 (e.g., instances of the text string 'turbine' from within the body of the document are shown in the redaction view 170). In one embodiment, the redaction manager 150 displays each instance of content 162 dynamically while conducting the search. In an alternate embodiment, the redaction manager 150 displays each instance of content 162 in the redaction view 170 after the entire search has been completed.

Figure 6:
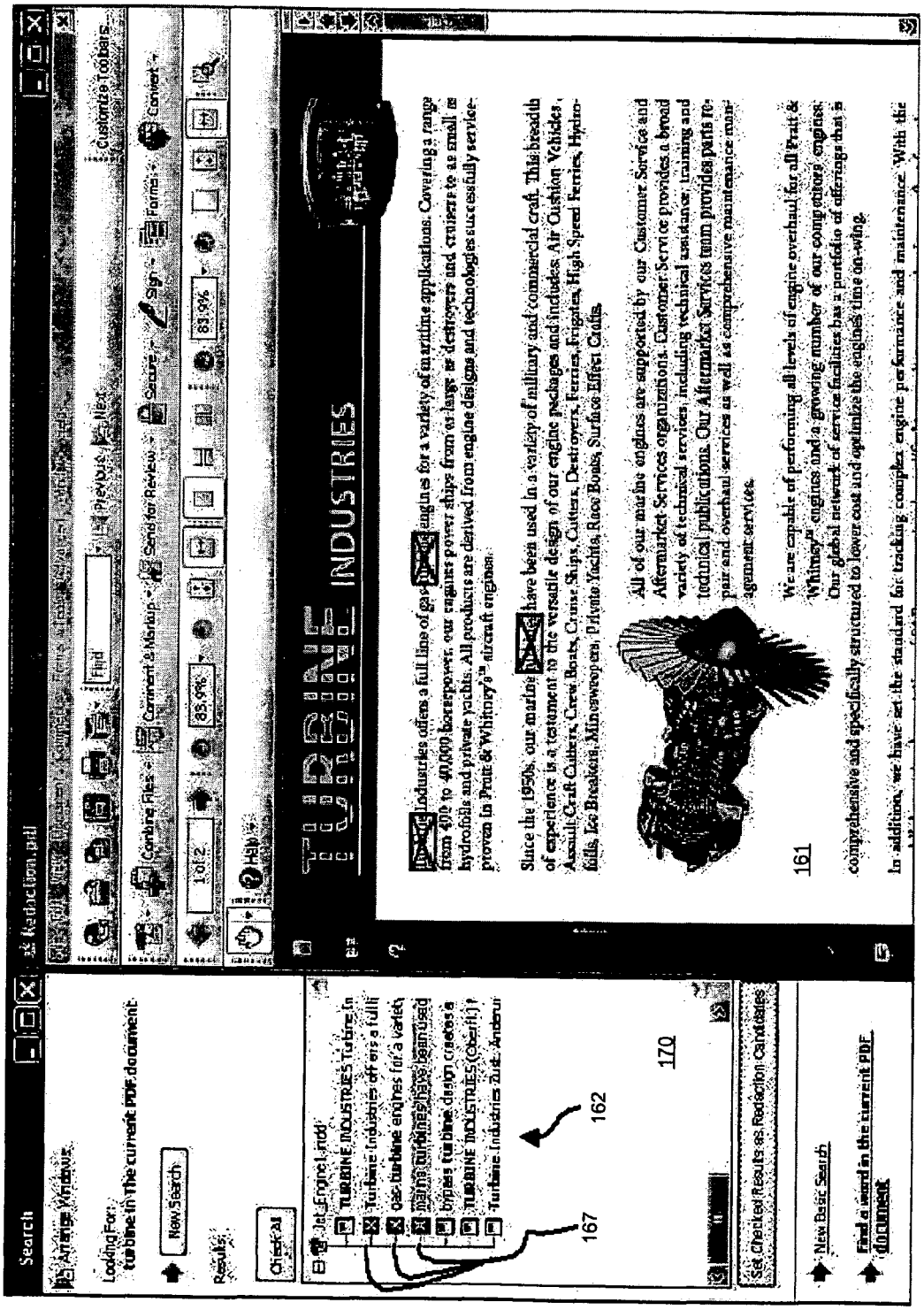
FIG. 6 is a graphical representation that illustrates one implementation of the redaction manager process when it receives a selection of at least one instance of content.

In step 205, the redaction manager 150 receives a selection 167 of at least one instance of content. After the user 106 is presented with a list 169 of at least one instance of content 162, the user 106 may select at least one instance of content 162 from that list 169. As depicted in an example embodiment shown in FIG. 6, the redaction manager 150 receives a selection 167 of three instances of content 162 in the redaction view 170 of the graphical user interface 160. In this example, the selection 167 of the instances of content 162 are graphically denoted by an 'X' displayed in a box located next to each user-selected instance of content 162.

Figure 7:
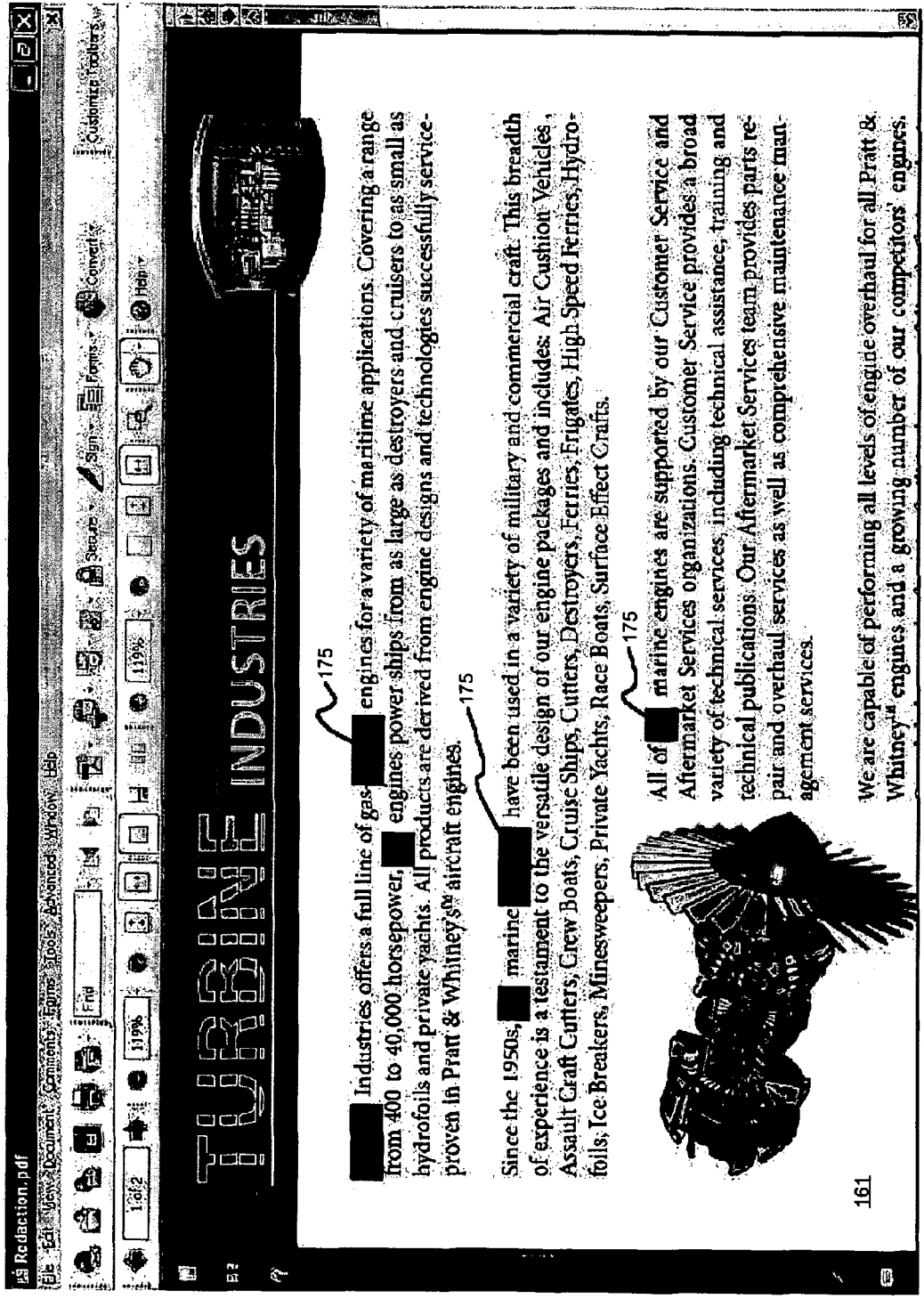
FIG. 7 is a graphical representation that illustrates one implementation of the redaction manager process when it applies a redaction function to content in a document corresponding to at least one selected instance of content.

In step 206, the redaction manager 150, in response, applies the redaction function to content 190 in the document corresponding to the at least one selected instance of content 162. In various embodiments, the redaction function operates as a typical software redaction tool commonly known in art. To that effect, a typical redaction function modifies the redaction region (e.g., converts all pixels within the redaction region to a uniform color) and removes the content from memory such that a subsequent user of the document would be unable to recover the redacted content. FIG. 7 represents an example embodiment whereby the redaction manager 150 applies a redaction function to content 190 (as selected from the corresponding instances of content 162 in the redaction view 170) in the document. In this particular embodiment, the redacted content 175 (e.g., formerly the text string "turbine") is displayed as a black rectangular box in the graphical display area 161 of the document.

Figure 8:
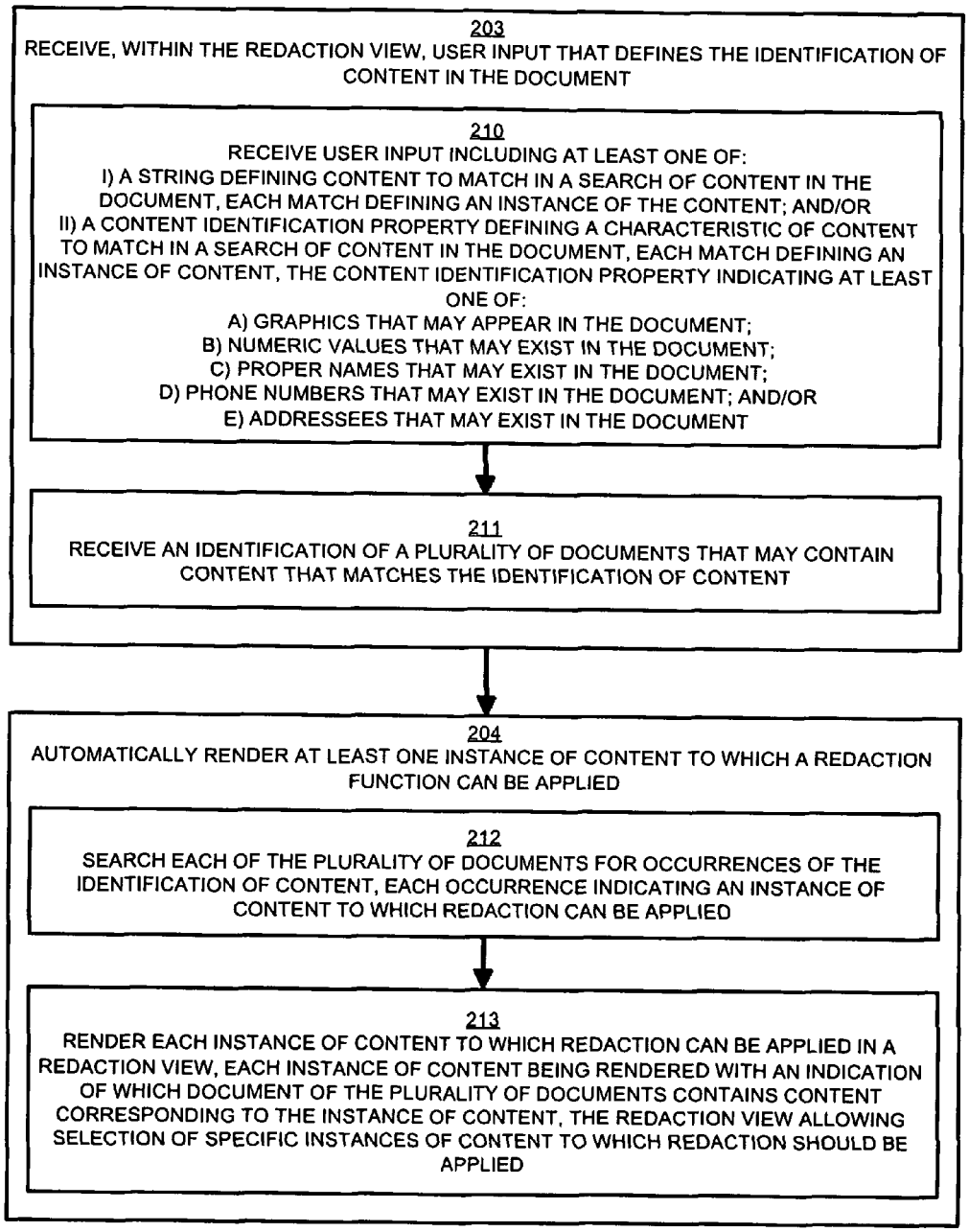
FIG. 8 is a flow chart of processing steps that shows high-level processing operations performed by the redaction manager process when it receives, within a redaction view, user input that defines an identification of content in the document in accordance with one example configuration of the invention.

FIG. 8 is a flow chart of processing steps that shows high-level processing operations performed by the redaction manager 150 when it identifies a second portion of content in a target layer in accordance with one example configuration.

In step 210, the redaction manager 150 receives user input 174 including at least one of, i) a string defining content to match in a search of content in the document, each match defining an instance of the content 162, and/or ii) a content identification property defining a characteristic of content to match in a search of content in the document. Additionally, each match defines an instance of content 162 whereby the content identification property indicates at least one of, a) graphics that may appear in the document, b) numeric values that may exist in the document, c) proper names that may exist in the document, d) phone numbers that may exist in the document, and/or e) addresses that may exist in the document. It should be noted that although only certain content identification properties are discussed herein, the scope of the invention is not limited to those data properties and may include other similar searchable content identification properties.

As an example, FIG. 4 shows an example embodiment of the redaction manager 150 whereby a user 106 enters a text string (e.g., 'turbine') into the content identification region 171. As such, the text string defines content to match in a search of content 190 in the document such that each match defines an instance of the content 162. In various embodiments, the search may consist of a content identification property in addition to, or in lieu of, the text string that defines the searchable content. For instance, in one embodiment the content identification property indicates a graphic that may appear in the document (e.g., a user enters the text string 'dog' and the redaction manager searches for instances of graphics associated with the text string 'dog'). In another example embodiment, the content identification property is a numeric value and the redaction manager 150 searches for content matching a certain numeric value or numeric pattern (e.g., search for all instances of social security numbers).

In another example embodiment, upon receiving a text string in the content identification region 171 from a user 106, the redaction manager 150 performs Optical Character Recognition (OCR) on the graphical data in the document. By performing OCR, the redaction manager 150 is able to extract, or obtain, alphanumeric characters from graphical (e.g., bitmaps, JPEG's, and similar graphical formats), non-ASCII data in the document. Thus, after extracting alphanumeric content from the graphical regions in the document, the redaction manger 150 searches for content in the extracted data related to the user-defined text string that was previously entered into the content identification region 171.

For example, the redaction manager 150 could perform OCR on the graphical data shown in FIG. 4, whereby the graphical data includes the dark banner 179 across the top of the display area 161 containing the words in large letters "TURBINE INDUSTRIES". Assume for this example that the banner 179 is graphical image inserted into the document as a GIF image compression file. By using OCR, the redaction manager 150 can extract the letters (e.g., the alphanumeric content) "turbine industries" from the GIF image file such that the letters are now accessible by a user 106 as searchable content in the document. Depending on the state of the art, conventional OCR implementations may extract information from various graphical formats (e.g., bitmaps, JPEG's, GIF's, etc.). As such, the scope of the methods and apparatus disclosed herein contemplates the use of OCR algorithms known in the art.

In yet another embodiment, a user 106 may select whether or not the redaction manager should perform OCR (e.g., via an interactive graphical radio button, toggle button, dialogue box, etc.) when searching content in the document. It should be noted that the OCR operation may be performed as part of the redaction manager 150 executable process thread, through an application programming interface (API) as a separate process thread, or via similar means.

Figure 9:
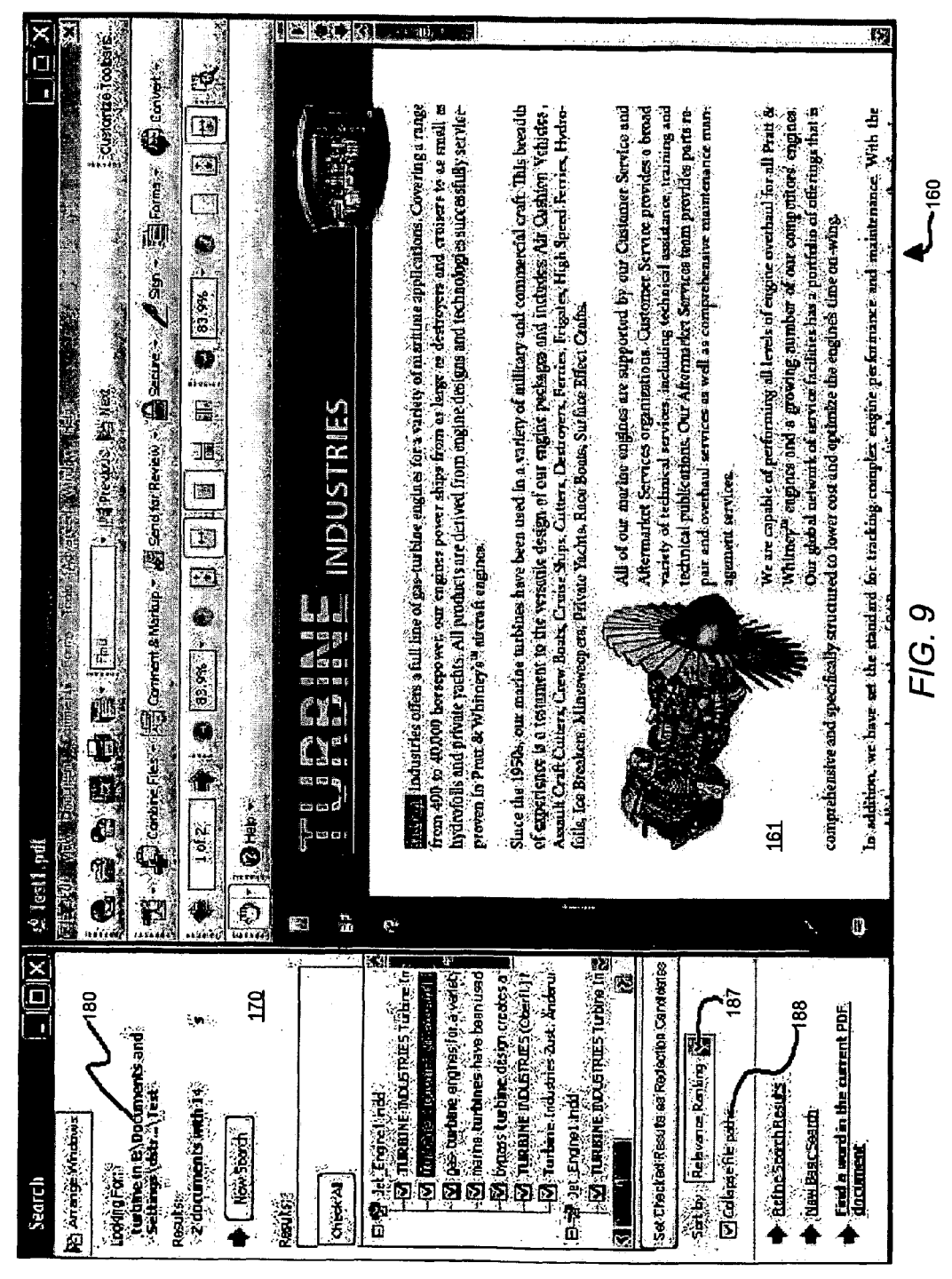

In step 211, the redaction manager 150 receives an identification of a plurality of documents 180 that may contain content that matches the identification of content 190. Typically, the identification of the plurality of documents 180 may be designated by one or more folders (e.g., a hierarchical configuration of folders in a file system) that encompass the plurality of documents. For example, FIG. 9 shows an example embodiment of the redaction manager 150 performing a search for content (e.g., 'turbine') in an identified plurality of documents 180 located in the folder "E:\Documents and Settings\dstr . . . \Test" as displayed in the redaction view 170 of the graphical user interface 160.

In step 212, the redaction manager 150 searches each of the plurality of documents for occurrences of the identification of content 190, each occurrence indicating an instance of content 162 to which redaction can be applied. It should be noted that the redaction manager may also perform a nested and/or recursive search of multiple folders in a hierarchical file system.

In step 213, the redaction manager 150 renders each instance of content 162 to which redaction can be applied in a redaction view 170, each instance of content 162 being rendered with an indication 186 of which document of the plurality of documents contains content corresponding to the instance of content, the redaction view allowing selection of specific instances of content 162 to which redaction should be applied. For example, FIG. 9 shows instances of content 162 found in the plurality of documents (e.g., "Jet_Engine1.indd" and "Jet_Engine2.indd") resulting from the redaction manager search of the folder 'Test' 180. It should be noted that in this particular embodiment the redaction manager 150 offers additional search result options such as, but not limited to, a sort function 187 and a collapsible file paths function 188. In effect, these additional features provide a user-friendly interface for conducting content searches that involve a plurality of documents.

Figure 10:
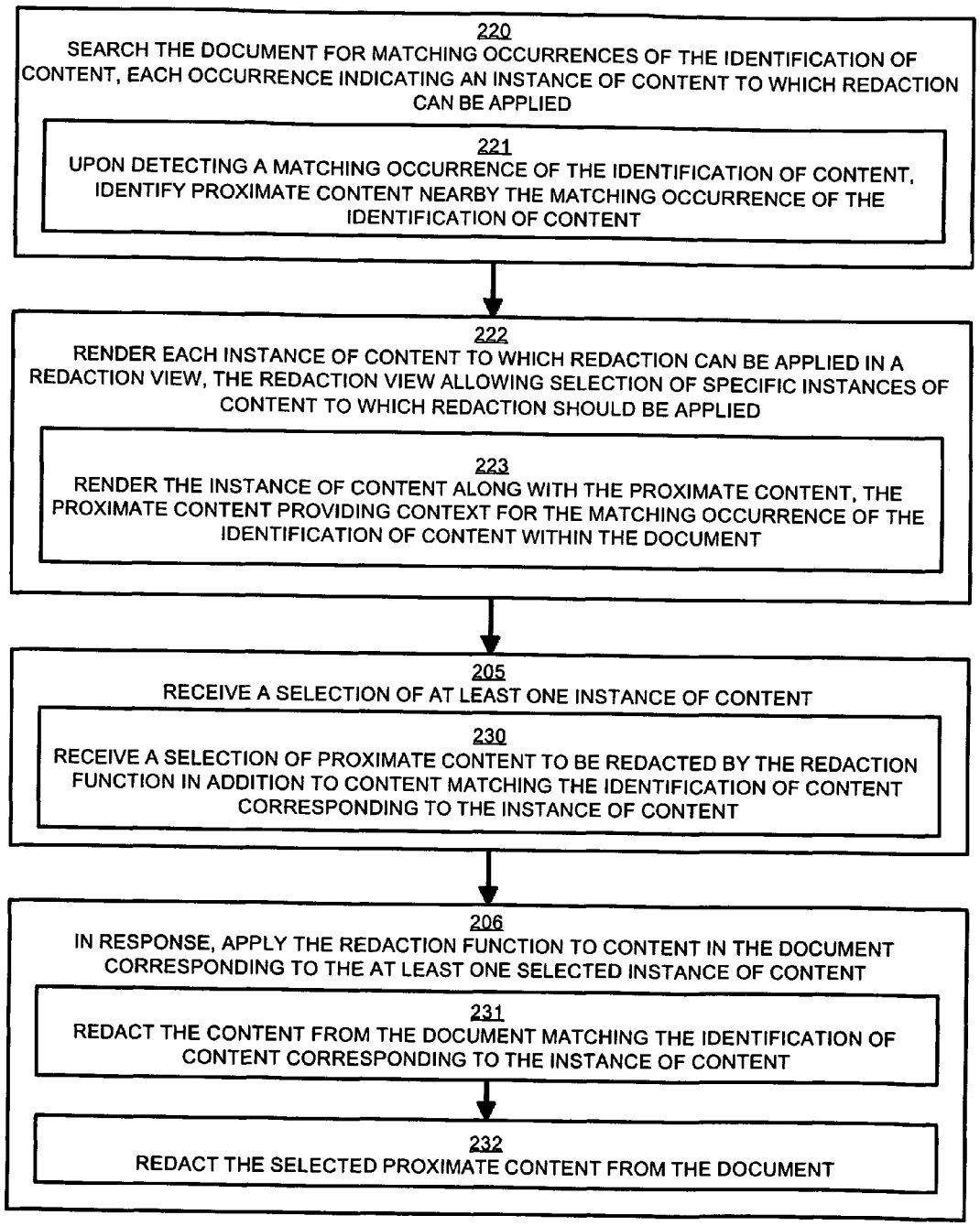
FIG. 10 is a flow chart of processing steps that shows high-level processing operations performed by the redaction manager process when it searches a document for matching occurrences of an identification of content, and renders each instance of content to which redaction can be applied in a redaction view in accordance with one example configuration of the invention.

FIG. 10 is a flow chart of processing steps that shows high-level processing operations performed by the redaction manager 150 when it identifies a second portion of content in a target layer in accordance with one example configuration.

In step 220, the redaction manager 150 searches the document for matching occurrences 191 of the identification of content 190, each occurrence indicating an instance of content 162 to which redaction can be applied. Typically, the redaction manager 150 searches for matching occurrences 191 of text strings within a document. Alternate embodiments include the redaction manager 150 searching for matching instances of graphic (e.g., image data) and/or alphanumerical pattern content (e.g., phone numbers, social security numbers, addresses, etc.).

In step 221, the redaction manager 150, upon detecting a matching occurrence 191 of the identification of content 190, identifies proximate content 192 nearby the matching occurrence 191 of the identification of content 190. To state it differently, the redaction manager 150 detects content graphically situated nearby the matching occurrence 191 of content. The redaction manager 150 identifies the proximate content 192 to provide context to a user such that the user can quickly familiarize himself with the intent and purpose of the matching occurrence 191 of content within the document.

In step 222, the redaction manager 150 renders each instance of content 162 to which redaction can be applied in a redaction view 170, the redaction view allowing selection of specific instances of content 162 to which redaction should be applied. FIG. 5 depicts an example embodiment of the redaction manager 150 with a graphical user interface 160 that includes a display area 161 and redaction view 170. As can be seen in this figure, the redaction manager 150 renders instances of content 162 (e.g., "turbine") to which redaction can be applied in the redaction view 170

In step 223, the redaction manager 150 renders the instance of content 162 along with the proximate content 192, the proximate content providing context for the matching occurrence 191 of the identification of content within the document. For example, FIG. 5 depicts an example configuration whereby the redaction manager 150 displays instances of matching content 162 (e.g., "turbine") along with proximate content 192 (e.g., portions of text graphically situated nearby the occurrences of "turbine" in the document) in the redaction view 170 of the graphical user interface 160.

In step 224, the redaction manager 150 receives a selection of proximate content to be redacted by the redaction function in addition to content matching the identification of content 190 corresponding to the instance of content 162. In one example embodiment, the redaction manager 150 receives the selection of proximate content from a user 106 that highlights (e.g., by using an input device 116 such as a mouse) the particular proximate content 192 within the redaction view 170 of the graphical user interface 160.

In step 225, the redaction manager 150 redacts the content from the document matching the identification of content 190 corresponding to the instance of content 162. More specifically, the redaction manager redacts content in the document body (e.g., the display area 161) that corresponds to matching instances of content 162 that are selected in the redaction view 170 of the graphical user interface 160.

In step 226, the redaction manager 150 redacts the selected proximate content 192 from the document. Thus, in accordance with the application of the redaction function to content discussed herein, the redaction manager 150 applies the redaction function to the proximate content 192 located in the body of the document (e.g., the display area 161), whereby the proximate content 192 in the body of the document corresponds to the selected proximate content in the redaction view 170.

Figure 11:
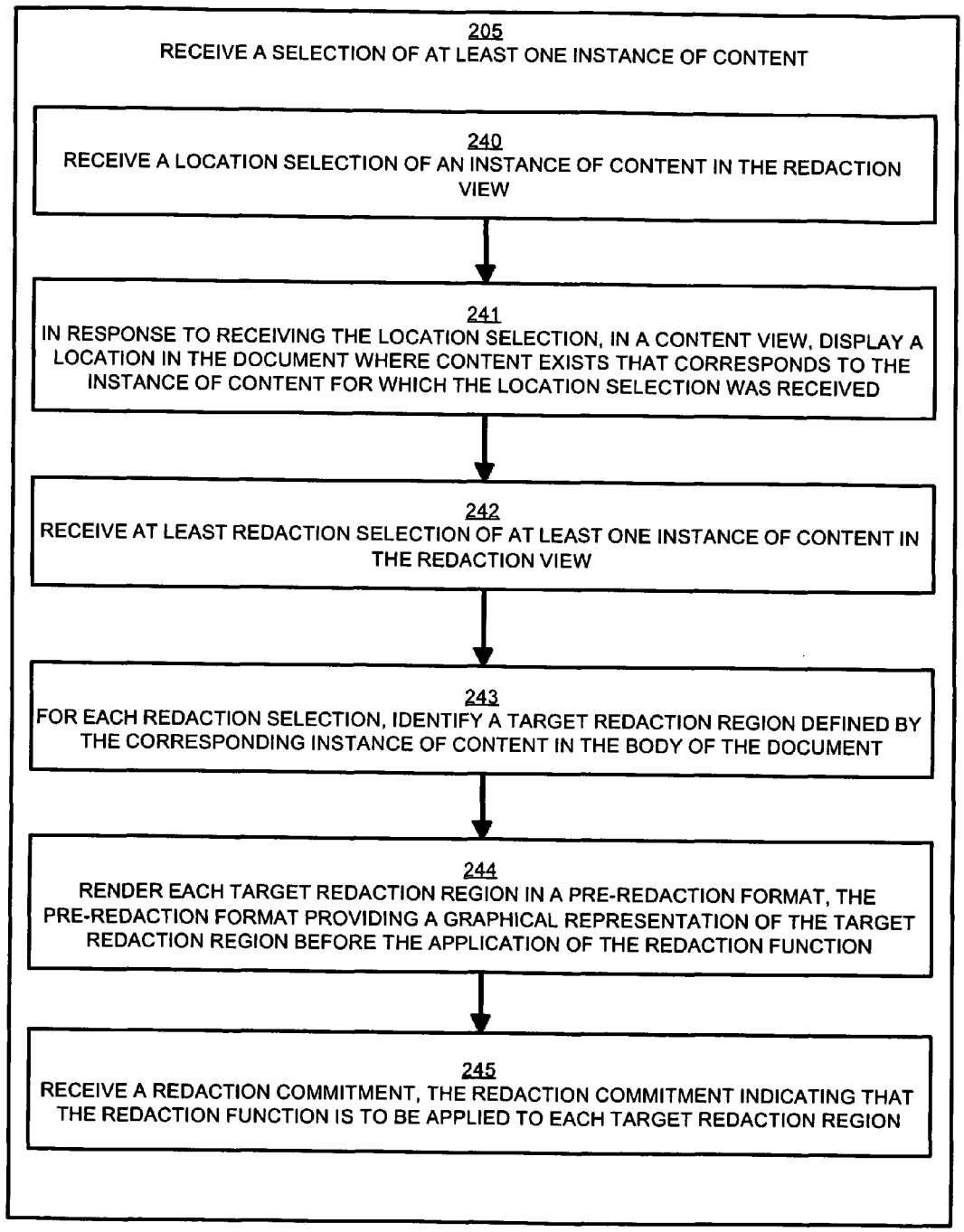
FIG. 11 is a flow chart of processing steps that shows high-level processing operations performed by the redaction manager process when it receives a selection of at least one instance of content in accordance with one example configuration of the invention.

FIG. 11 is a flow chart of processing steps that shows high-level processing operations performed by the redaction manager 150 when it identifies a second portion of content in a target layer in accordance with one example configuration.

In step 230, the redaction manager 150 receives a location selection 195 of an instance of content 162 in the redaction view 170. Generally, as in one embodiment, a user 106 activates the location selection 195 by graphically manipulating the input device 116 (e.g, a mouse) over the instance of content 162 for which a location selection 195 is desired. In addition to using a mouse for location selection purposes, once a particular instance of content has been activated the user 106 may proceed with activating subsequent location selections 195 by depressing the 'up' or 'down' keyboard buttons to scroll up and down the list 169 containing the instances of content 162 in the redaction view 170.

Figure 12:
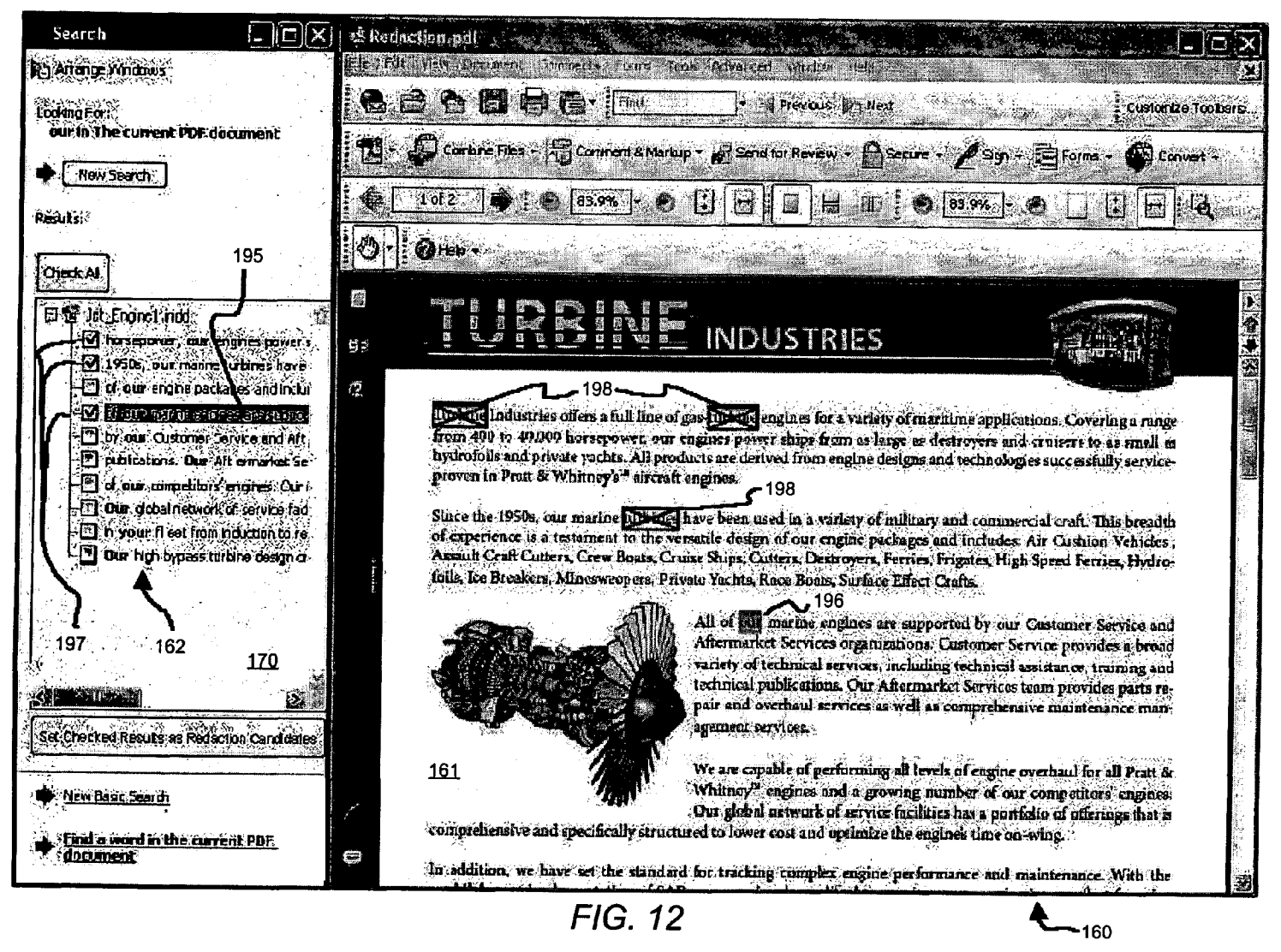

In step 231, the redaction manager 150, in response to receiving the location selection 195, in a content view 161, displays a location in the document where content exists 196 that corresponds to the instance of content 162 for which the location selection 195 was received. By displaying the location in the document where corresponding content exists 196, the redaction manager 150 provides a user 106 with an opportunity to visualize where the corresponding content 196 may be redacted within the body of the document. This step is particularly beneficial when instances of content listed in the redaction view have corresponding content dispersed in various sections of a document and are not simultaneously viewable within the content view 161. In one example embodiment, as shown in FIG. 12, the redaction manager 150 emphasizes (e.g., highlights) the corresponding content 196 within the content view 161. The emphasis allows a user to precisely locate the corresponding content 196 within the body of the document. In addition, as can be seen in FIG. 12, the redaction manger 150 emphasizes (e.g., highlights) the active instance of content 162 within the redaction view 170.

In step 232, the redaction manager 150 receives at least one redaction selection 197 of at least one instance of content 162 in the redaction view 170. Since the receipt of a location selection 195 merely displays corresponding content 196 within the body of the document (e.g., the content view 161), the redaction manager 150 must also receive a redaction selection 197 in order to determine which instances of content 162 are candidates for redaction. As shown in the example embodiment of FIG. 12, the redaction selections 197 are denoted by a check mark "✓" appearing in the box located next to the graphical representation of each instance of content 162.

In step 233, for each redaction selection 197, the redaction manager 150 identifies a target redaction region 198 defined by the corresponding instance of content 196 in the body of the document. The target redaction region 198 defines an area within the display area 161 (e.g., the content view) where the redaction function will be applied to the corresponding instance of content 196. Generally, in cases involving the redaction of text, the target redaction region 198 defines a rectangular area proximately surrounding the target content 196 to be redacted.

In step 234, the redaction manager 150 renders each target redaction region 198 in a pre-redaction format 199, whereby the pre-redaction format 199 provides a graphical representation of the target redaction region 198 before the application of the redaction function. The pre-redaction format 199 typically has a different graphical representation than the emphasis of the location selection 195 to enable a user to distinguish between located instances of content and instances of content that have been selected for redaction. FIG. 12 shows an example embodiment of the redaction manager 150 when it renders a box with an 'X' as the pre-redaction format 199 for the target redaction regions 198 of the corresponding content 198 (e.g., the text string "turbine").

Figure 13:
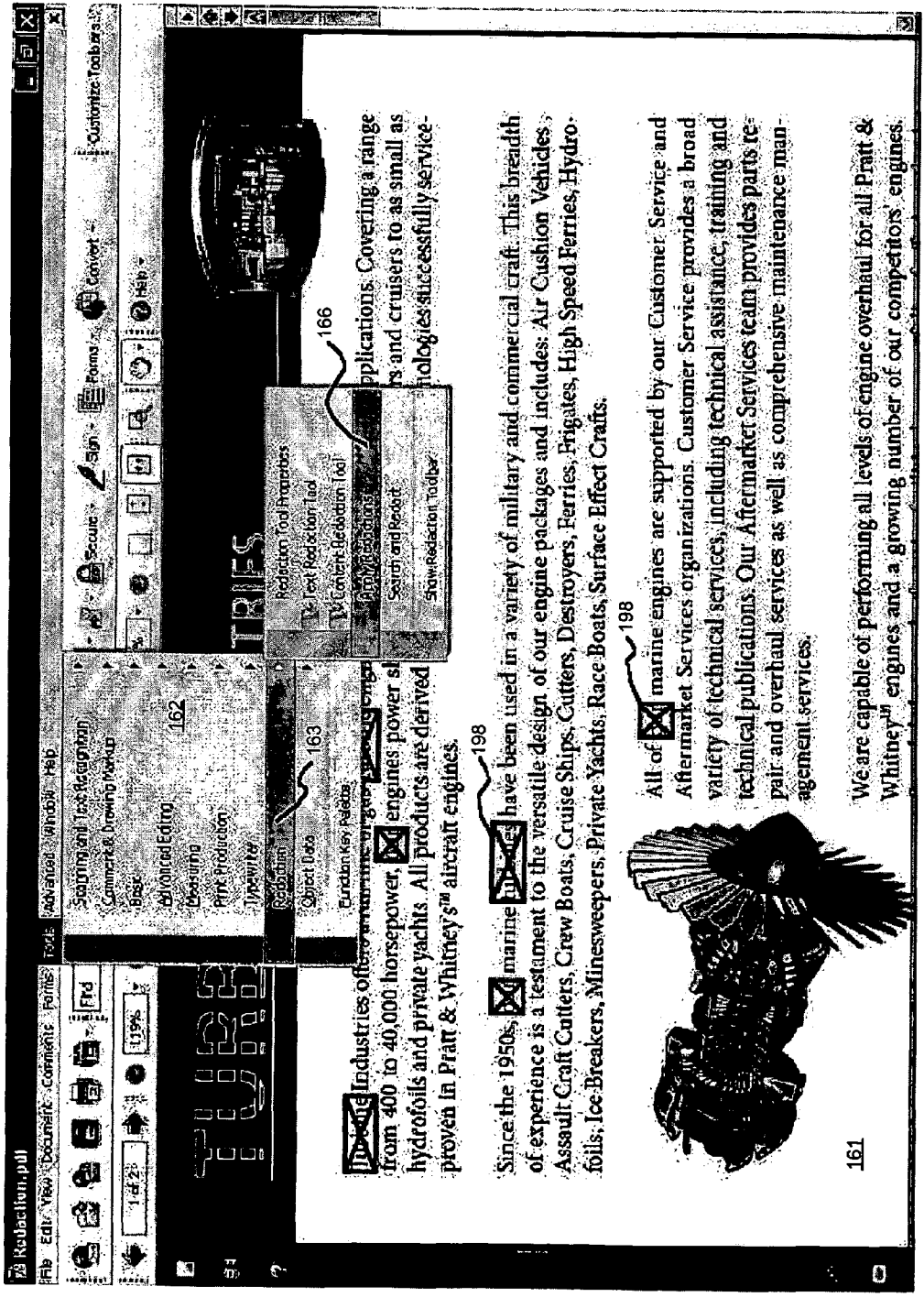
FIG. 13 is a graphical representation that illustrates one implementation of the redaction manager process when it receives a selection of a redaction operation to be applied to a document for the regions having a pre-redaction format defined by a target redaction region.

In step 235, the redaction manager 150 receives a redaction commitment 166 which indicates that the redaction function is to be applied to each target redaction region 198. Thus, after a user 106 has selected the desired instances of content 162 for redaction, he must activate the redaction function by selecting the redaction commitment 166. FIG. 13 depicts an example embodiment the redaction manager 150 displaying a graphical user interface 160 with a drop down menu 162 including a redaction commitment selection 166.

It is noted that example configurations disclosed herein include the redaction manager application 150-1 itself (i.e., in the form of un-executed or non-performing logic instructions and/or data). The redaction manager application 150-1 may be stored on a computer readable medium (such as a floppy disk), hard disk, electronic, magnetic, optical or other computer readable medium. The redaction manager application 150-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the redaction manager application 150-1 in the processor 113 as the redaction manager process 150-2. In another alternative configuration, the redaction manager process 150-2 may be embedded in the operating system or may operate as a separate process from the application and may track all user input or only some user input (such as mouse movement or clicks, but not keyboard input). Those skilled in the art will understand that the computer system 110 may include other processes and/or software and hardware components, such as an operating system not shown in this example.

While configurations of the system and method have been particularly shown and described with references to configurations thereof, it will be understood by those skilled in the art that various changes in form and details may be made therein without departing from the scope of the invention. Accordingly, the present invention is not intended to be limited by the example configurations provided above.

What we claim is:

1. A method for processing data comprising:
   receiving, by a processor, input that identifies content from a body of a document to be redacted, wherein the body of the document is depicted in a content view of a graphical user interface;
   searching, by the processor, the document for a plurality of instances of the content to be redacted;
   rendering, by the processor, a list identifying the plurality of instances of the content found in response to searching the document, wherein the list is depicted in a redaction view of the graphical user interface separate from the content view, the plurality of instances of the content being simultaneously displayable in the list and simultaneously selectable from the list;

in response to receiving, by the processor, a selection of at least one instance of the content in the list for redaction, displaying in the content view the portion of the body with a pre-redaction format applied to the selected instance of the content, wherein the pre-redaction allows the selected instance of content to remain viewable; and in response to receiving, by the processor, an indication to perform a redaction operation on the selected instance of the content displaying, by the processor, the portion of the body in the content view with a redaction format applied to the selected instance of the content, wherein the redaction format redacts the selected instance of content from view.

2. The method of claim 1 wherein receiving input that identifies content of the document to be redacted comprises:

receiving a selection of content from within the body of the document as displayed in the content view of the graphical user interface;

wherein the selected content from within the body of the document identifies the content to be redacted.

3. The method of claim 1 wherein searching for the one or more instances of related content comprises identifying the related content based at least on a content identification property defining a characteristic of the content the content identification property indicating at least one of:

a) graphics that may appear in the document;
b) numeric values that may exist in the document;
c) proper names that may exist in the document;
d) phone numbers that may exist in the document;
e) addresses that may exist in the document; and
f) a pattern of characters that may exist in the document.

4. The method of claim 1 wherein searching the document comprises identifying proximate content near each instance of the content; and wherein rendering the list comprises rendering the plurality of instances of the content along with the corresponding proximate content.

5. The method of claim 4, further comprising:

receiving a selection of proximate content to be redacted;
wherein performing the redaction operation further comprises applying the redaction format to the selected proximate content.

6. The method of claim 1 wherein searching the document comprises:

performing an Optical Character Recognition (OCR) operation to obtain alphanumeric content from graphical data in the document.

7. The method of claim 1, wherein searching the document for the plurality of instances of the content to be redacted further comprises searching a plurality of documents for instances of the content in the plurality of documents, wherein rendering the list identifying the plurality of instances further comprises rendering the plurality of instances of the content with an indication of which document of the plurality of documents contains content corresponding to the instance of the content, and wherein the list allows selections of specific instances of the content across the plurality of documents for redaction.

8. The method of claim 1, wherein searching the document for the plurality of instances of the content to be redacted further comprises searching for one or more instances of related content, and wherein the list identifies the plurality of instances of the content and the one or more instances of the related content.

9. A computer program product comprising a nontransitory computer-readable medium embodying code, the code comprising:

code that, when executed, configures a processor to receive input that identifies content from a body of a document to be redacted, wherein the body of the document is depicted in a content view of a graphical user interface;

code that, when executed, configures the processor to search the document for a plurality of instances of the content to be redacted;

code that, when executed, configures the processor to render a list identifying the plurality of instances of the content found in response to searching the document, wherein the list is depicted in a redaction view of the graphical user interface separate from the content view, the plurality of instances of the content being simultaneously displayable in the list and selectable from the list;

code that, when executed, configures the processor in response to receiving a selection of at least one instance of the content in the list for redaction, to display in the content view the portion of the body with a pre-redaction format applied to the selected instance of the content, wherein the pre-redaction allows the selected instance of content to remain viewable; and code that, when executed, configures the processor in response to receiving an indication to perform a redaction operation on the selected instance of the content, to display the portion of the body in the content view with a redaction format applied to the selected instance of the content, wherein the redaction format redacts the selected instance of content from view.

10. The computer program product of claim 9, wherein receiving input that identifies content of the document to be redacted comprises:

receiving a selection of content from within the body of the document as displayed in the content view of the graphical user interface, wherein the selected content from within the body of the document identifies the content to be redacted.

11. The computer program product of claim 9, wherein the input that identifies content of the document to be redacted comprises:

a content identification property defining a characteristic of content to match in a search of content in the document, each match defining an instance of the content, the content identification property indicating at least one of:

a) graphics that may appear in the document;
b) numeric values that may exist in the document;
c) proper names that may exist in the document;
d) phone numbers that may exist in the document;
e) addresses that may exist in the document; and
f) a pattern of characters that may exist in the document.

12. The computer program product of claim 9, wherein searching the document comprises identifying proximate content near each instance of the content; and wherein rendering the list comprises rendering the plurality of instances of the content along with the corresponding proximate content.

13. The computer program product of claim 12, further comprising:

code that, when executed, configures the processor to receive a selection of proximate content to be redacted, wherein performing the redaction operation further comprises applying the redaction format to the selected proximate content.

14. A system comprising:
a processor; and
a memory,
wherein the memory embodies at least one program component that configures the processor to:
receive input that identifies content from a body of a document to be redacted, wherein the body of the document is depicted in a content view of a graphical user interface;
search the document for a plurality of instances of the content to be redacted;
render a list identifying the plurality of instances of the content found in response to searching the document, wherein the list is depicted in a redaction view of the graphical user interface separate from the content view, the plurality of instances of the content being simultaneously displayable in the list and selectable from the list;
in response to receiving a selection of at least one instance of the content in the list for redaction, displaying in the content view the portion of the body with a pre-redaction format applied to the selected instance of the content, wherein the pre-redaction allows the selected instance of content to remain viewable; and
in response to receiving an indication to perform a redaction operation operation on the selected instances of the content displaying the portion of the body in the content view with a redaction format applied to the selected instance of the content, wherein the redaction format redacts the selected instance of content from view.

15. The system of claim 14, wherein receiving input that identifies content of the document to be redacted comprises:
receiving a selection of content from within the body of the document as displayed in the content view of the graphical user interface,
wherein the selected content from within the body of the document identifies the content to be redacted.

16. The system of claim 14, wherein the input that identifies content of the document to be redacted comprises:
  i) a string defining content to match in the search of content in the document, each match defining an instance of the content; or
  ii) a content identification property defining a characteristic of content to match in a search of content in the document, each match defining an instance of the content, the content identification property indicating at least one of:
  a) graphics that may appear in the document;
  b) numeric values that may exist in the document;
  c) proper names that may exist in the document;
  d) phone numbers that may exist in the document;
  e) addresses that may exist in the document; and
  f) a pattern of characters that may exist in the document.

17. The system of claim 14, wherein searching the document comprises identifying proximate content near each instance of the content; and
wherein rendering the list comprises rendering the plurality of instances of the content along with the corresponding proximate content.

18. The system of claim 17, wherein the at least one program component further configures the processor to receive a selection of proximate content to be redacted,
wherein performing the redaction operation further comprises applying the redaction format to the selected proximate content.

* * * * *